United States Patent
Taniguchi (10) Patent No.: US 11,503,046 B2
(45) Date of Patent: Nov. 15, 2022

(54) CYBER ATTACK EVALUATION METHOD AND INFORMATION PROCESSING APPARATUS

(71) Applicant: FUJITSU LIMITED, Kawasaki (JP)

(72) Inventor: Tsuyoshi Taniguchi, Katsushika (JP)

(73) Assignee: FUJITSU LIMITED, Kawasaki (JP)

(*) Notice: Subject to any disclaimer, the term of this patent is extended or adjusted under 35 U.S.C. 154(b) by 308 days.

(21) Appl. No.: 16/749,680

(22) Filed: Jan. 22, 2020

(65) Prior Publication Data
US 2020/0244679 A1    Jul. 30, 2020

(30) Foreign Application Priority Data

Jan. 25, 2019   (JP) .............................. JP2019-011310

(51) Int. Cl.
*H04L 9/40*     (2022.01)
*H04L 61/4511*  (2022.01)

(52) U.S. Cl.
CPC ...... *H04L 63/1416* (2013.01); *H04L 61/4511* (2022.05); *H04L 63/1425* (2013.01); *H04L 63/1466* (2013.01); *H04L 63/20* (2013.01)

(58) Field of Classification Search
None
See application file for complete search history.

(56) References Cited

U.S. PATENT DOCUMENTS

2016/0026796 A1* 1/2016 Monrose ............. H04L 63/1441
                                                      726/24
2016/0294773 A1  10/2016 Yu et al.
(Continued)

FOREIGN PATENT DOCUMENTS

EP      3647982 A1     5/2020
JP      2011-193343    9/2011
(Continued)

OTHER PUBLICATIONS

Chiba, Daika et al., "DomainProfiler: Discovering Domain Names Abused in Future", 2016 46th Annual IEEE/IFIP International Conference on Dependable Systems and Networks (DSN), pp. 491-502, available from ieeexplore.ieee.org/document/7579766{last accessed Jun. 18, 2020].
(Continued)

*Primary Examiner* — Kevin T Bates
*Assistant Examiner* — Emad Siddiqi
(74) *Attorney, Agent, or Firm* — Fujitsu Patent Center (57) ABSTRACT

A evaluation method by a computer, the method includes: making, based on domain information included in input cyber attack information, an inquiry about whether an address associated with the domain information exists to multiple first servers that manage associations between the domain information and addresses; make an inquiry about an answer history related to the domain information to a second server that monitors communication of the first servers and manages answer histories, related to the associations between the domain information and the addresses, of the first servers; and outputting a result of diagnosing a threat detail of a cyber attack related to the domain information based on a ratio of the number of answers indicating that an address associated with the domain information does not exist with respect to the number of answers acquired from each of the first servers, and the answer histories acquired from the second server.

4 Claims, 10 Drawing Sheets

(56) References Cited

U.S. PATENT DOCUMENTS

| | | | |
|---|---|---|---|
| 2018/0191736 A1 | 7/2018 | Cho et al. | |
| 2018/0270254 A1 | 9/2018 | Chiba et al. | |
| 2018/0309772 A1 | 10/2018 | Song et al. | |
| 2018/0351976 A1* | 12/2018 | Shitrit-Efergan | ... H04L 63/1425 |
| 2019/0132344 A1* | 5/2019 | Lem | ........................ G06N 5/022 |
| 2020/0045077 A1 | 2/2020 | Chiba et al. | |

FOREIGN PATENT DOCUMENTS

| | | |
|---|---|---|
| JP | 2018-513592 | 5/2018 |
| WO | 2016/140038 A1 | 9/2016 |
| WO | 2018/163464 A1 | 9/2018 |

OTHER PUBLICATIONS

Great Britain Search Report dated Jun. 26, 2020 for corresponding Great Britain Patent Application No. 2000749.8, 4 pages.

* cited by examiner

| CACHE DNS NAME | DNS SERVER |
|---|---|
| CACHE DNS1 | aaa.aaa.aaa.1 |
| ... | ... |
| CACHE DNSi | bbb.bbb.bbb.11 |

FIG. 4

```
[XXXX@localhost ~]$ dig www.XXXXXX.co.jp

; <<>> Dig 9.9.4-RedHat-9.9.4-18.el7 <<>> www.XXXXXX.co.jp
;; global options: +cmd
;; Got answer:
;; ->>HEADER<<- opcode: QUERY, status: NOERROR, id: 60115
;; flags: qr rd ra; QUERY: 1, ANSWER: 1, AUTHORITY: 0, ADDITIONAL: 1

;; OPT PSEUDOSECTION:
; EDNS: version: 0, flags:; udp: 4096
;; QUESTION SECTION:
;www.XXXXXX.co.jp.              IN      A ;; ANSWER SECTION:
www.XXXXXX.co.jp.       49      IN      A       XXX.XXX.XXX.XXX ;; Query time: 9 msec
;; SERVER: YYY.YYY.Y.Y#53(YYY.YYY.Y.Y)
;; WHEN: MONTH XX MONTH XX 23:XX:XX JST 2017
;; MSG SIZE  rcvd: 61

[XXXX@localhost ~]$
```

FIG. 5

| DOMAIN | CACHE DNS1 | CACHE DNS2 | ... | CACHE DNSi | NO-ANSWER RATIO |
|---|---|---|---|---|---|
| xxx.xxxx.com | ddd.ddd.ddd.ddd | ddd.ddd.ddd.ddd | ... | ddd.ddd.ddd.ddd | |
| ... | ... | ... | ... | ... | |
| yyy.yyyy.org | No Answer | No Answer | ... | No Answer | |
| ... | ... | ... | ... | ... | |

| DOMAIN | Active DNS | Passive DNS | VERIFICATION RESULT |
|---|---|---|---|
| xxx.xxxx.com | Records exist | | |
| ... | ... | | |
| yyy.yyyy.org | No Answer | | |
| ... | ... | | |
| zzz.zzzz.net | Records exist | | |
| ... | ... | | |
| vvv.vvvv.biz | No Answer | | |
| ... | ... | | |

| DOMAIN | Active DNS | Passive DNS | VERIFICATION RESULT |
|---|---|---|---|
| xxx.xxxx.com | Records exist | Records exist | ACTIVE |
| ... | ... | ... | ... |
| yyy.yyyy.org | No Answer | No Answer | NO TRACE |
| ... | ... | ... | ... |
| zzz.zzzz.net | No Answer | Records exist | ACTION TERMINATED |
| ... | ... | ... | ... |
| vvv.vvvv.biz | Records exist | No Answer | ACTIVE |
| ... | ... | ... | ... |

CYBER ATTACK EVALUATION METHOD AND INFORMATION PROCESSING APPARATUS

CROSS-REFERENCE TO RELATED APPLICATION

This application is based upon and claims the benefit of priority of the prior Japanese Patent Application No. 2019-11310, filed on Jan. 25, 2019, the entire contents of which are incorporated herein by reference.

FIELD

The embodiments discussed herein are related to a cyber attack evaluation technique.

BACKGROUND

In recent years, cyber attacks such as invalid access made via networks are severe problems. To handle such cyber attacks, it is important to analyze a large amount of cyber attack information monitored daily and detect malicious communication from an attack source.

One of existing methods of detecting malicious communication uses a black list of malicious domains. The black list may be received in the Portable Document Format (PDF) format or the like even when the black list is in a text format or the comma-separated values (CSV) format or is a document.

Discussion is internationally underway to establish standardization for sharing Cyber Threat Intelligence, which is a report on profile information of attackers. Formats including Structured Threat Information expression (STIX) exist. STIX is composed of 8 information groups, cyber threats (Campaigns), threat actors (Threat_Actors), tactics, techniques, and procedures (TTPs), indicators (Indicators), observables (Observables), incidents (Incidents), courses of action (Course_Of_Action), and exploit targets (Exploit_Targets). In STIX version 1.1.1, the black list is described in the eXtensible Markup Language (XML) format.

Indicators such as the black list or Cyber Treat Intelligence include information of malicious domains, Internet Protocol (IP) addresses, and Uniform Resource Locators (URLs). As a traditional technique, a method is known, which is to acquire information indicating whether a list of communication destinations that is to be used to evaluate the communication destinations, such as malicious domains included in indicators, IP addresses, or URLs is posted at a predetermined time point, extract, as characteristic information, a change over time in the information indicating whether the list is posted, and calculate maliciousness of the communication destinations.

For example, a related technique is disclosed in International Publication Pamphlet No. WO 2016-140038.

SUMMARY

According to an aspect of the embodiments, an apparatus includes: making, based on domain information included in input cyber attack information, an inquiry about whether an address associated with the domain information exists to a plurality of first managing servers that manage associations between the domain information and addresses; making an inquiry about an answer history related to the domain information to a second managing server that monitors communication of the first managing servers and manages answer histories, related to the associations between the domain information and the addresses, of the first managing servers; and outputting a result of diagnosing a threat detail of a cyber attack related to the domain information based on a ratio of the number of answers indicating that an address associated with the domain information does not exist with respect to the number of answers acquired from each of the first managing servers, and the answer histories acquired from the second managing server.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Indicators such as the black list or Cyber Threat Intelligence are useful and static at the time when the indicators are made public, and it is difficult to evaluate whether the indicators are useful at the time when the indicators are useful.

For example, the Domain Name System (DNS) is used for a normal service not related to a cyber attack and for a malicious service related to a cyber attack. If an attacker uses the DNS without intending to hide a trace of a domain and an inquiry is made to a DNS server, the trace remains in the DNS and a malicious activity may be followed. When a private DNS server is built to execute name resolution in a blockchain or the like so that a trace of an attack by an attacker does not remain in the DNS, the trace does not remain in the DNS. Thus, the fact that the trace does not remain in the DNS is a trace indicating that the activity is a malicious activity that is not based on a normal operation of the DNS.

However, in the verification of an indicator, when an activity related to a domain used to achieve a purpose of an attack by an attacker is already terminated, a relationship of an IP associated with the domain is removed from the DNS. In this state, even when an inquiry is made to the DNS server, the name resolution is not able to be executed. It is therefore difficult to verify whether the DNS is used so that any trace does not remain in the DNS, and whether the domain has been removed although the DNS has been used.

A DNS server among various DNS servers references the black list for security and blocks a malicious domain. When an inquiry is made to the DNS server in the verification of an indicator, it is difficult to distinguish domain removal from the blocking. In one aspect, it is desirable to support evaluation of indicators related to cyber attacks.

A cyber attack evaluation program, a cyber attack evaluation method, and an information processing device according to an embodiment are described below with reference to the drawings. In the embodiment, configurations having the same function are indicated by the same symbol, and a duplicated description is omitted. The cyber attack evaluation program, the cyber attack evaluation method, and the information processing device, which are described in the following embodiment, are merely an example and are not intended to limit the embodiment. The following embodiments may be appropriately combined without contradiction.

Figure 1:
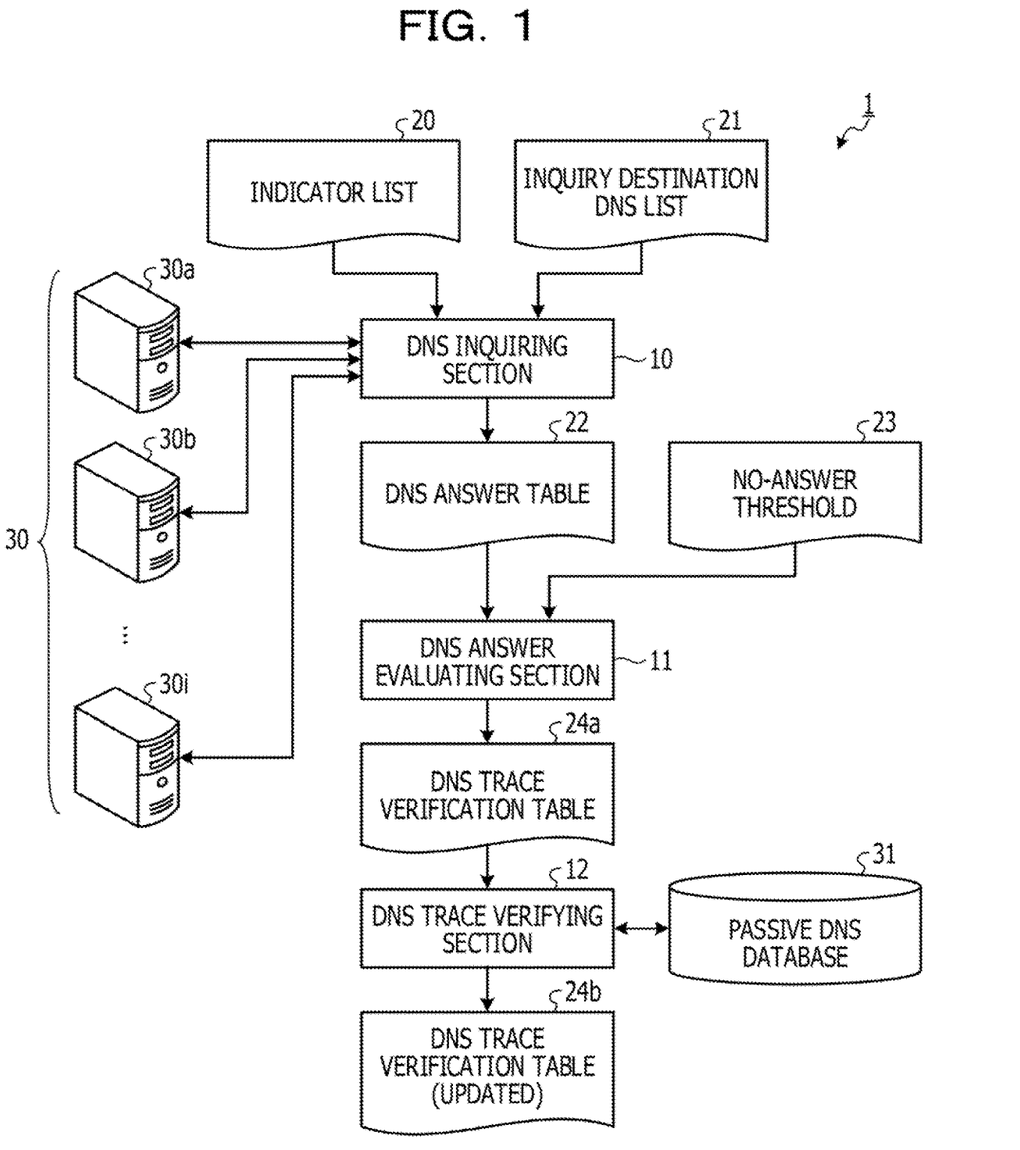
FIG. 1 is a block diagram illustrating an example of a functional configuration of an information processing device according to an embodiment.

FIG. 1 is a block diagram illustrating an example of a functional configuration of the information processing device according to the embodiment. The information processing device 1 according to the embodiment is a computer, such as a personal computer (PC), for example.

As illustrated in FIG. 1, the information processing device 1 receives an input indicator list 20 of indicators to be used to detect malicious communication. The indicator list 20 is a so-called black list generated by extracting information from Cyber Treat Intelligence and includes, as indicators, domain information (for example, domain names related to malicious domains, such as "xxx.xxxx.com" and "yyy.yyyy.org") on malicious domains related to attack sources. The indicators of the indicator list 20 are an example of cyber attack information.

For example, the indicator list 20 is a list obtained by extracting malicious domains from a black list of malicious domains made public or is a list obtained by causing a purser or the like to process indicators described in Cyber Treat Intelligence that is profile information of specific attacks (campaigns and malware).

The information processing device 1 outputs a DNS trace verification table (updated) 24b indicating diagnosed threat details of cyber attacks related to domain information for the input indicator list 20. Based on the DNS trace verification table (updated) 24b, a user may evaluate whether the malicious domains included in the indicator list 20 are currently useful to detect malicious communication.

For example, the information processing device 1 includes a DNS inquiring section 10, a DNS answer evaluating section 11, and a DNS trace verifying section 12.

The DNS inquiring section 10 is a processing section that makes, based on the domain information of the input indicator list 20, an inquiry about whether an IP address associated with the domain information exists to cache domain name system (DNS) servers 30a, 30b, . . . , and 30i, which manage associations between the domain information and IP addresses. The cache DNS servers 30a, 30b, . . . , and 30l are an example of first managing servers that manage associations between domain information and IP addresses. When the cache DNS servers 30a, 30b, . . . , and 30i are not distinguished from each other, the cache DNS servers 30a, 30b, . . . , and 30l are referred to as cache DNS servers 30. In the embodiment, IP addresses are exemplified as the addresses associated with the domain information and to be managed by the cache DNS servers 30. The addresses associated with the domain information and to be managed may be MAC addresses or the like, instead of the IP addresses.

For example, the DNS inquiring section 10 makes, to the multiple cache DNS servers 30 described in an inquiry destination DNS list 21 set by the user or the like in advance, an inquiry about whether an IP address associated with the domain information of the indicator list 20 exists, based on the inquiry destination DNS list 21. Then, the DNS inquiring section 10 outputs, as a DNS answer table 22, inquiry results, acquired from the multiple cache DNS servers 30, of making the inquiry about whether the IP address associated with the domain information of the indicator list 20 exists. For example, the DNS inquiring section 10 is an example of an inquiring section.

The DNS inquiring section 10 outputs a query to Active DNS and collects information on the associations between the domain information and the IP addresses. Managing servers that are destinations to which the inquiry is made are not limited to the cache DNS servers 30. Active DNS is known, as described in "Kountouras, Athanasios, et al. "Enabling network security through active DNS datasets." International Symposium on Research in Attacks, Intrusions, and Defenses. Springer, Cham, 2016." and the like.

In Active DNS, a domain "seed" to be used to output a query is prepared. The "seed" may be obtained by referencing a zone file of an authoritative DNS server, web crawling, a top list of Alexa, a black list made public, or the like. When seeds are prepared in a comprehensive manner, DNS information wider than that obtained based on Passive DNS (described later in detail) may be collected, but there is a trade-off with the cost for the collection of the seeds.

Figure 2:
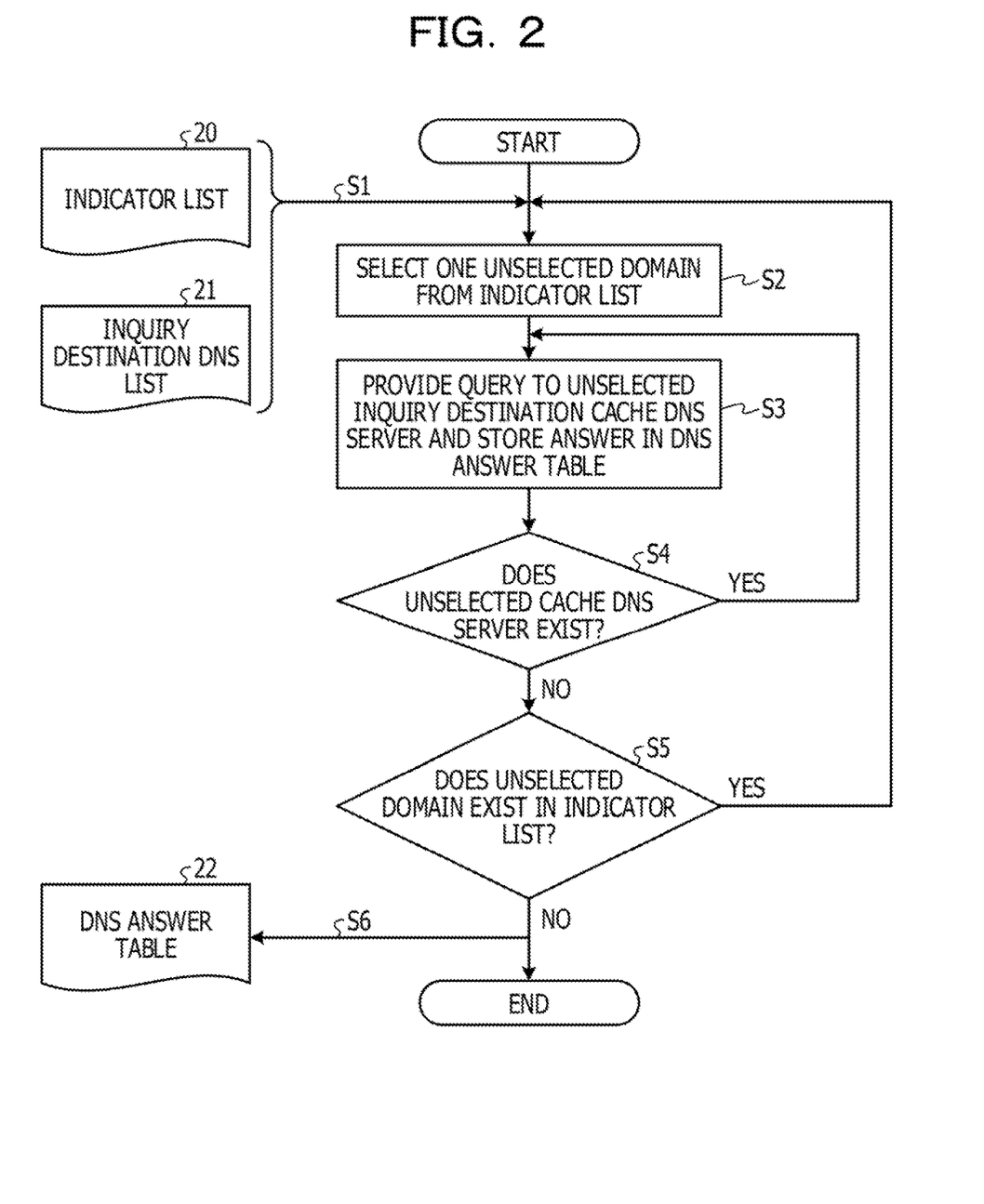
FIG. 2 is a flowchart illustrating an example of a DNS inquiry process.

FIG. 2 is a flowchart illustrating an example of a DNS inquiry process. As illustrated in FIG. 2, when the process is started, the DNS inquiring section 10 receives the input indicator list 20 and the inquiry destination DNS list 21 (in S1).

Subsequently, the DNS inquiring section 10 selects one unselected domain from the indicator list 20 (in S2). Subsequently, the DNS inquiring section 10 outputs a query about the domain to an unselected inquiry destination cache DNS server 30 registered in the inquiry destination DNS list 21. Subsequently, the DNS inquiring section 10 causes an answer to the query to be stored in the DNS answer table 22 (in S3).

Figure 3:
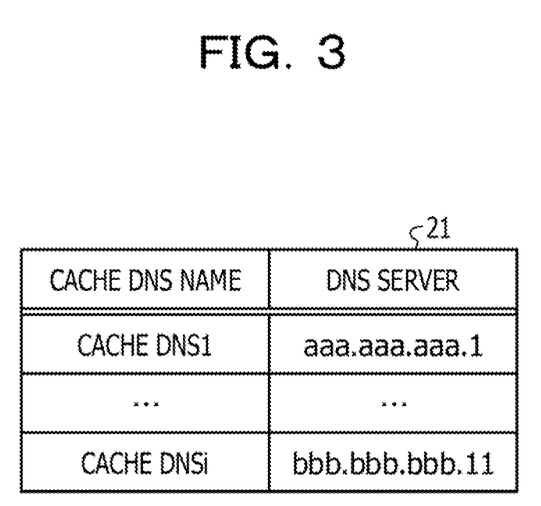
FIG. 3 is an explanatory diagram illustrating an example of an inquiry destination DNS list.

FIG. 3 is an explanatory diagram illustrating an example of the inquiry destination DNS list 21. As illustrated in FIG. 3, the inquiry destination DNS list 21 is a list of the inquiry destination cache DNS servers 30 and includes "cache DNS names" and "DNS servers". For example, in a column for the "cache DNS names", the names (for example, "cache DNS1" and the like) of the cache DNS servers 30 to be used are stored. In a column for the "DNS servers", IP addresses (for example, "aaa.aaa.aaa.1" and the like) of the corresponding cache DNS servers 30 are stored. The inquiry destination DNS list 21 may include IP addresses of alternative servers to be used when an inquiry is made to the IP addresses of the "DNS servers" and an answer is not obtained. However, when an alternative server does not exist, data, such as "N/A", is stored.

It is assumed that, as the cache DNS servers 30 registered in the inquiry destination DNS list 21, public cache DNS servers, such as Google (registered trademark) Public DNS servers or Cloudflare (registered trademark) cache DNS servers are basically used. The cache DNS servers 30 registered in the inquiry destination DNS list 21 are not limited to the public cache DNS servers and may be cache DNS servers of an Internet service provider (ISP) with which the user has a contract.

The DNS inquiring section 10 makes an inquiry about a domain to the IP addresses stored in the "DNS servers" of the inquiry destination DNS list 21. When a Linux (registered trademark)-based operating system (OS) is used, a dig command is used to make an inquiry to the cache DNS servers 30 as a method of making an inquiry to the cache DNS servers 30.

Figure 4:
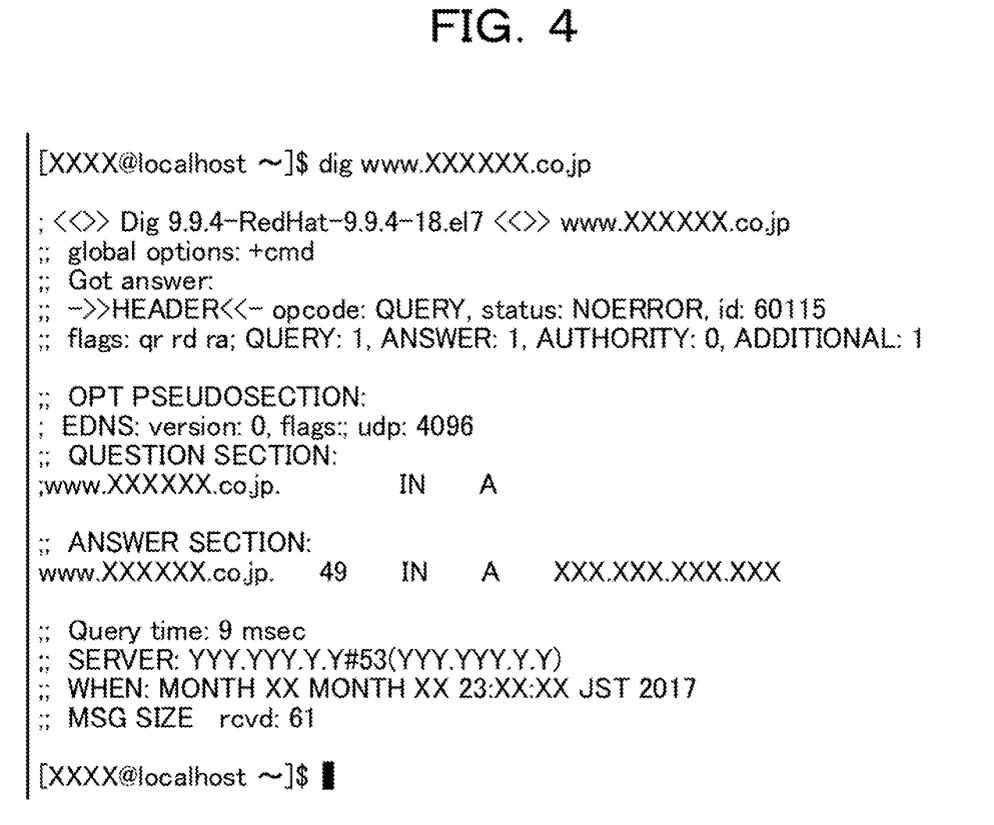
FIG. 4 is an explanatory diagram illustrating an example of a query by a dig command.

FIG. 4 is an explanatory diagram illustrating an example of the query by the dig command. In the example illustrated in FIG. 4, the dig command is used to make an inquiry about a value of an IP address "www.XXXXXX.co.jp" to a DNS server. For this inquiry, an A record (IP address) of "www.XXXXXX.co.jp" is returned as "XXX.XXX.XXX.XXX" following "IN A" in the next row of ";; ANSWER SECTION:". "A" of the A record is an abbreviation for "address".

In the embodiment, "@IP address" is added as an argument to specify a cache DNS server 30. For example, a command "dig @8.8.8.8 www.XXXXXX.co.jp" is used to make an inquiry to Google Public DNS. Other various options for the dig command exist, but will not be described. When a Windows (registered trademark)-based OS is used, an nslookup command or the like may be used.

After S3, the DNS inquiring section 10 determines whether an unselected cache DNS server 30 exists in the inquiry destination DNS list 21 (in S4). When the unselected cache DNS server 30 exists (Yes in S4), the DNS inquiring section 10 causes the process to proceed to the process of S3 and continuously executes the processes of S3 and S4 until all the cache DNS servers 30 are selected.

When the unselected cache DNS server 30 does not exist (No in S4), the DNS inquiring section 10 determines whether an unselected domain exists in the indicator list 20 (in S5). When the unselected domain exists (Yes in S5), the DNS inquiring section 10 causes the process to return to the process of S2 and continuously executes the processes of S2 to S5 until all the domains are selected.

When the unselected domain does not exist (No in S5), the DNS inquiring section 10 outputs the DNS answer table 22 storing answers to inquiries to the multiple cache DNS servers 30 for each of the domains (in S6) and terminates the DNS inquiry process.

Figure 5:
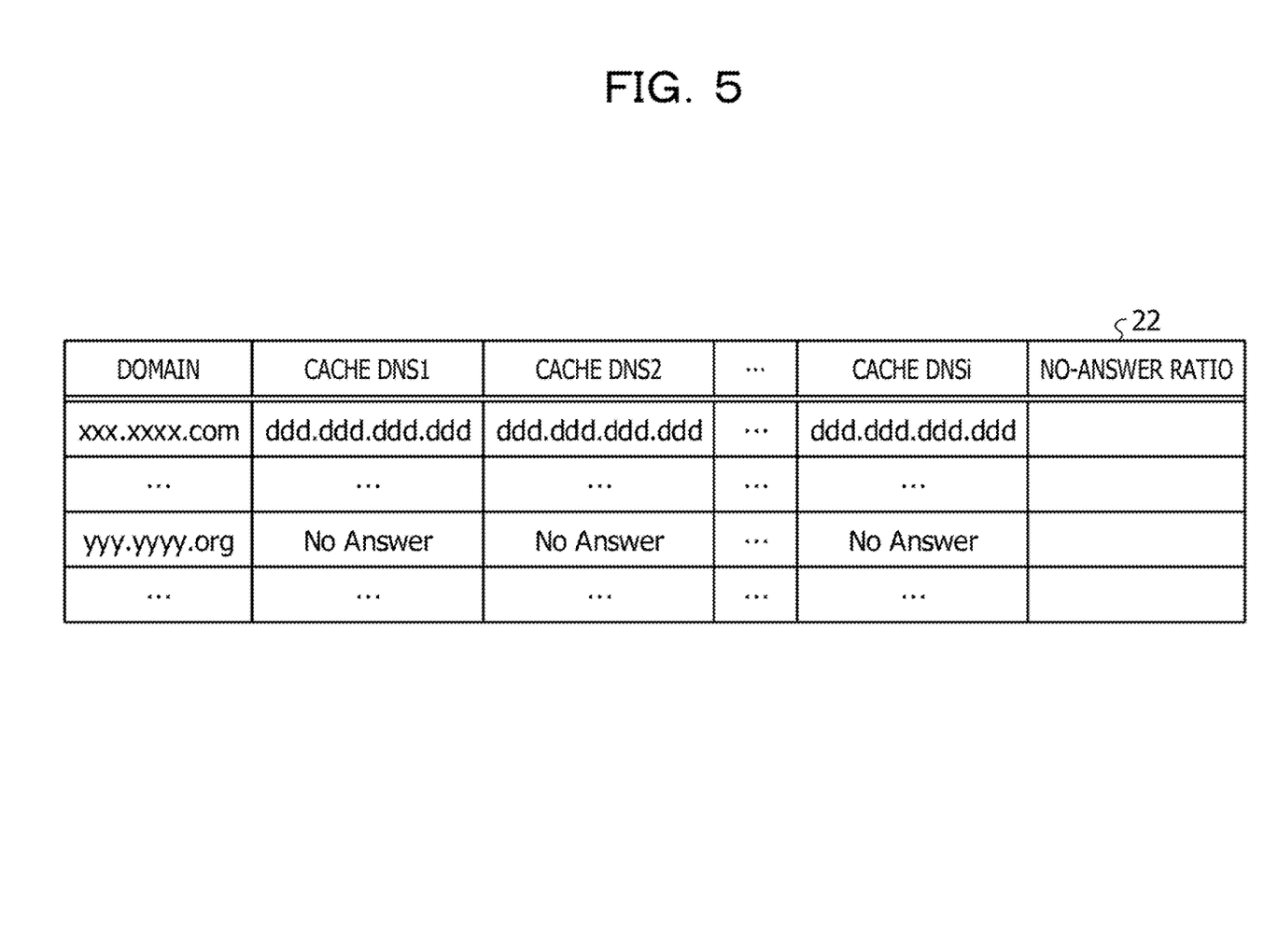
FIG. 5 is an explanatory diagram illustrating an example of a DNS answer table.

FIG. 5 is an explanatory diagram illustrating an example of the DNS answer table 22. As illustrated in FIG. 5, results of making inquiries for the "domains" of the indicator list 20 are stored in, for example, a table format in the DNS answer table 22. For example, the DNS answer table 22 includes, for each of the domains, answer results ("cache DNS1", . . . , and "cache DNSi") to inquiries made to "cache DNS1", . . . , and "cache DNSi" stored in the inquiry destination DNS list 21 and a no-answer ratio to be used for a subsequent process.

In the DNS answer table 22 illustrated in FIG. 5, an IP address "ddd.ddd.ddd.ddd" is stored as answers of all the cache DNS servers 30 for a domain "xxx.xxxx.com". "No Answer" indicating that an IP address associated with a domain "yyy.yyyy.org" does not exist is stored as answers of all the cache DNS servers 30 for the domain "yyy.yyyy.org".

"No Answer" is an example of an answer indicating that an IP address does not exist. The answer indicating that an IP address does not exist is not limited to the foregoing example or "No Answer" and may be "N/A", "Not Applicable", or the like.

Return to FIG. 1. The DNS answer evaluating section 11 is a processing section that executes a DNS answer evaluation process of evaluating results of verifying traces in the cache DNS servers 30 from answer results to inquiries made for the "domains" of the indicator list 20 based on the DNS answer table 22.

For example, the DNS answer evaluating section 11 calculates, for answer results for each of the "domains" stored in the DNS answer table 22, a no-answer ratio that is the ratio of the number of answers indicating that an IP address associated with the domain information does not exist with respect to the number of all answers. Then, the DNS answer evaluating section 11 compares the no-answer ratio with a no-answer threshold 23 set in advance for each of the "domains" and outputs, as a DNS trace verification table 24a, results of verifying traces in the DNS.

The embodiment exemplifies a configuration for calculating, as the no-answer ratio, the ratio of the number of answers indicating that an IP address associated does not exist with respect to the number of all answers of the cache DNS servers 30 registered in the inquiry destination DNS list 21. The DNS answer evaluating section 11, however, may calculate, as the no-answer ratio, the ratio of the number of answers indicating that an IP address associated does not exist with respect to the number of answers of some of the cache DNS servers 30 registered in the inquiry destination DNS list 21. Alternatively, the DNS answer evaluating section 11 may calculate the ratio of the number of answers indicating that an IP address associated with respect to the number of answers among all the answers.

Figure 6:
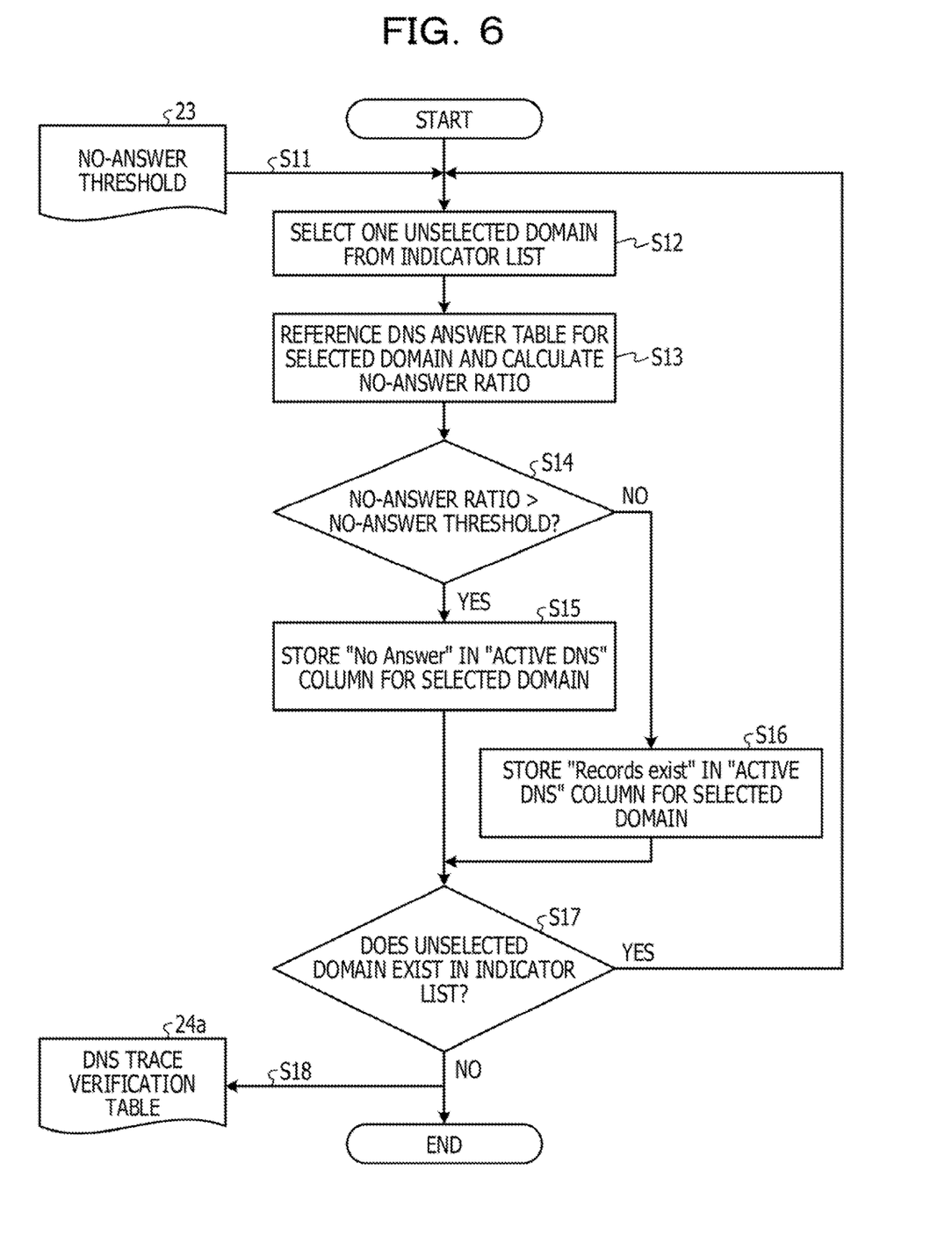
FIG. 6 is a flowchart illustrating an example of a DNS answer evaluation process.

FIG. 6 is a flowchart illustrating an example of the DNS answer evaluation process. As illustrated in FIG. 6, when the process is started, the DNS answer evaluating section 11 receives the input no-answer threshold 23 set in advance (in S11).

Subsequently, the DNS answer evaluating section 11 select one unselected domain from the indicator list 20 (in S12). Then, the DNS answer evaluating section 11 references the DNS answer table 22 for the selected domain and calculates the no-answer ratio according to the following Equation (in S13) and causes the result of the calculation to be stored in a "no-answer ratio" column (refer to FIG. 5) of the DNS answer table 22. The no-answer ratio=(the number of cache DNS servers 30 that have not provided an answer)/ (the number of all cache DNS servers 30 to which an inquiry has been made)

A process of calculating the no-answer ratio is executed based on the following two items. The first item is an effect of blocking by the cache DNS servers 30.

A cache DNS server 30 for which operational security is enhanced may not provide an answer for a domain that is known as a malicious domain based on a black list or the like even when an association between the domain and an IP address exists. In this case, whether the blocking is executed or the association is removed may not be basically clarified. It is, however, rear that all the cache DNS servers 30 block the malicious domain. In most cases, one or two cache DNS servers 30 for which security is enhanced as a policy do not provide an answer (or are estimated to execute the blocking).

Thus, when the no-answer threshold 23 is set to a relatively high value (of 0.8 to 0.9), the fact that an answer is not provided due to the blocking may be determined.

The second item is an effect of the remaining association between the domain and the IP address. An old association may remain depending on operations of the cache DNS servers 30 regardless of the fact that the association is already removed. Alternatively, an IP address that leads to an error screen for the old association may be associated with the cache DNS servers 30. In this case, a small number of cache DNS servers 30 return an IP address and may avoid erroneous detection by setting the no-answer threshold 23.

After S13, the DNS answer evaluating section 11 compares the calculated no-answer ratio with the no-answer threshold 23 and determines whether the no-answer ratio>the no-answer threshold 23 (in S14).

When the no-answer ratio exceeds the no-answer threshold 23 (Yes in S14), the DNS answer evaluating section 11 registers the selected domain in the DNS trace verification table 24a and causes "No Answer" to be stored in an "Active DNS" column for the registered domain (in S15).

When the no-answer ratio does not exceed the no-answer threshold 23 (No in S14), the DNS answer evaluating section 11 registers the selected domain in the DNS trace verification table 24a and causes "Records exist" to be stored in the "Active DNS" column for the registered domain (in S16).

Then, the DNS answer evaluating section 11 determines whether an unselected domain exists in the indicator list 20 (in S17). When the unselected domain exists (Yes in S17), the DNS answer evaluating section 11 causes the process to return to S12 and continuously executes the processes of S12 to S17 until all the domains are selected.

When the unselected domain does not exist (No in S17), the DNS answer evaluating section 11 outputs the DNS trace verification table 24a storing results of verifying traces in the cache DNS servers 30 for the domains (in S18) and terminates the process.

Figure 7:
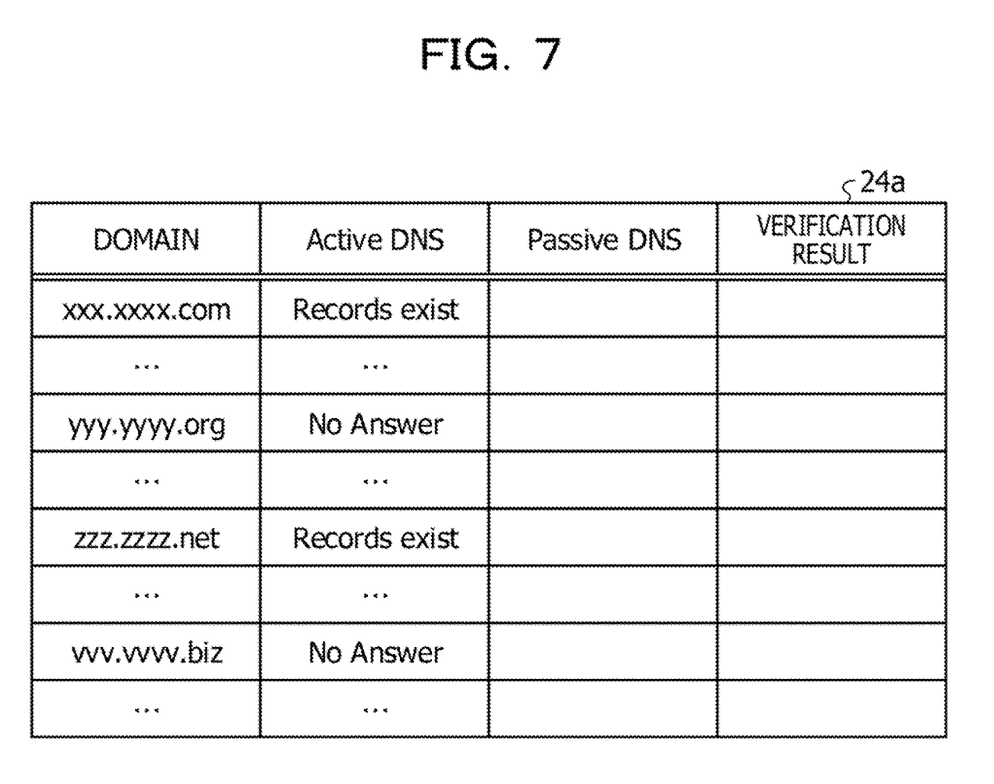
FIG. 7 is an explanatory diagram illustrating an example of a DNS trace verification table.

FIG. 7 is an explanatory diagram illustrating an example of the DNS trace verification table 24a. As illustrated in FIG. 7, results ("Active DNS") of verifying traces in the cache DNS servers 30 are stored in, for example, a table format in the DNS trace verification table 24a for the "domains" indicated in the indicator list 20.

For example, the DNS answer table 22 includes a "domain" column, an "Active DNS" column, a "Passive DNS" column, and a "verification result" column. In the "domain" column, a selected domain is stored. In the "Active DNS" column, a result of verifying a trace in a cache DNS server 30, or "Records exist" indicating that an answer has been provided or "No Answer" indicating that an answer has not been provided is stored. In the "Passive DNS" and "verification result" domains, data for a post-processing section is stored.

Return to FIG. 1. The DNS trace verifying section 12 is a processing section that makes an inquiry about answer histories related to the domains indicated in the indicator list 20 to the passive DNS database 31 to be used to monitor communication of the cache DNS servers 30 and manage answer histories related to the associations between the domain information and the IP addresses. The DNS trace verifying section 12 is a processing section that outputs, as the DNS trace verification table (updated) 24b, results ("verification results") of diagnosing threat details of cyber attacks, based on results of making inquiries about answer histories to the passive DNS database 31 and results (DNS trace verification table 24a) of verifying traces in the cache DNS servers 30 based on no-answer ratios, for each of the domains indicated in the indicator list 20. The DNS trace verifying section 12 is an example of an inquiring section and a verifying section.

A DNS packet returned by an authoritative DNS server is captured for Passive DNS in the Passive DNS database 31, not zone file transfer but DNS packet. A basic concept is that a resource record is extracted for Passive DNS. A Passive DNS server monitors communication of the DNS servers and manages, as the Passive DNS database 31, answer histories, related to the associations between the domain information and the IP addresses, of the DNS servers. The Passive DNS server is an example of a second managing server.

Passive DNS may reduce a load to be applied due to the zone file transfer. An advantage of Passive DNS is that, in the case where time information on a response to a query and the resource record are stored, when an emergency, such as an incident, occurs, the state of utilized attack infrastructure on the DNS may be reproduced. Passive DNS is known, as described in a document, such as "Weimer, Florian. "Passive DNS replication." FIRST conference on computer security incident. 2005." or the like.

The DNS trace verifying section 12 executes a DNS trace verification process of outputting the DNS trace verification table (updated) 24b updated by adding, to the DNS trace verification table 24a, verification results based on past behaviors of the cache DNS servers 30, based on answer histories in the foregoing Passive DNS database 31 and results of verifying traces in the cache DNS servers 30 based on the no-answer ratios.

Figure 8:
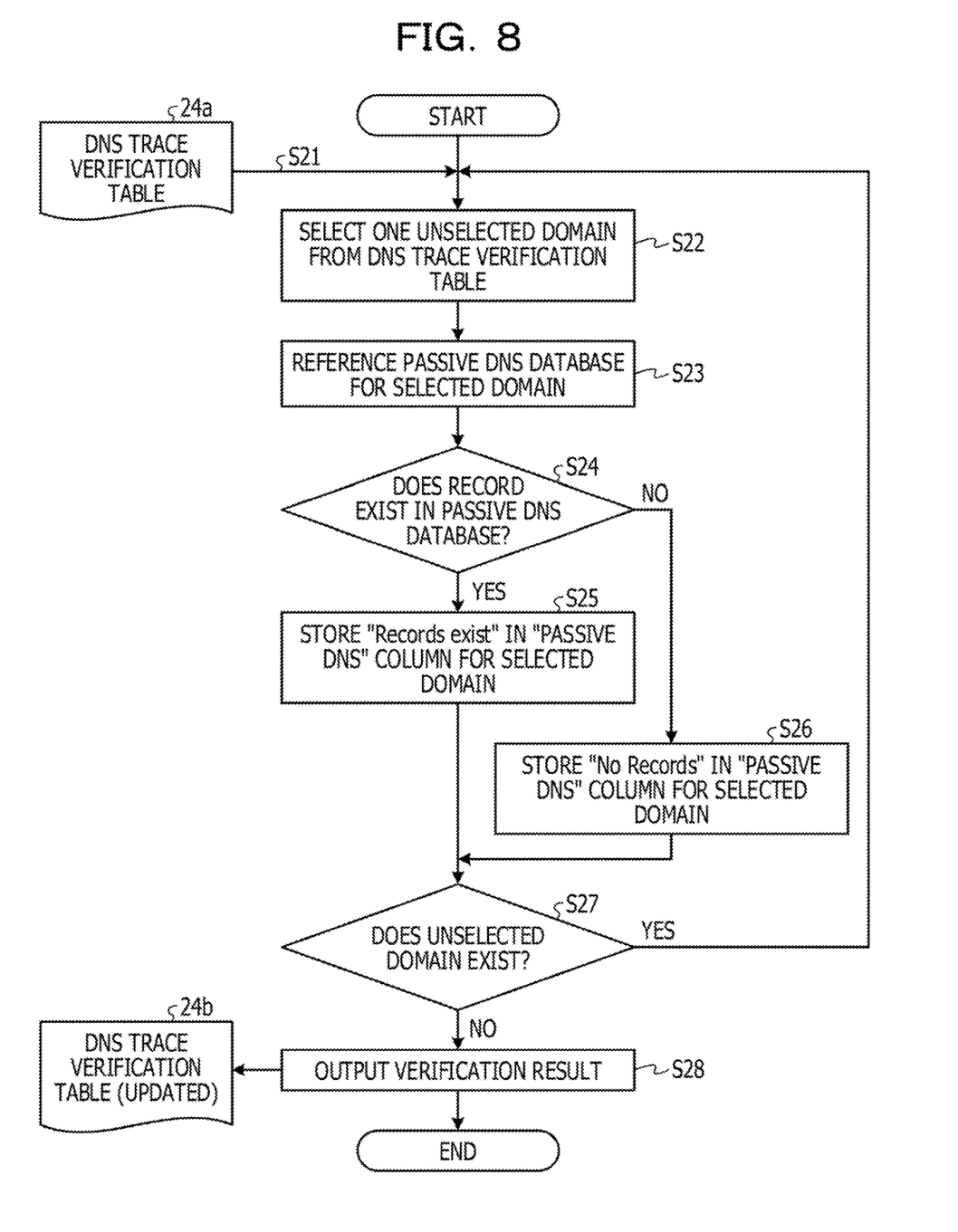
FIG. 8 is a flowchart illustrating an example of a DNS trace verification process.

FIG. 8 is a flowchart illustrating an example of the DNS trace verification process. As illustrated in FIG. 8, when the process is started, the DNS trace verifying section 12 receives the input DNS trace verification table 24a output by the DNS answer evaluating section 11 (in S21).

Then, the DNS trace verifying section 12 selects one unselected domain from the DNS trace verification table 24a (in S22). Subsequently, the DNS trace verifying section 12 references the Passive DNS database 31 for the selected domain (in S23) and determines whether a record for the selected domain exists in the Passive DNS database 31 (in S24).

When the record exists (Yes in S24), the DNS trace verifying section 12 causes "Records exist" to be stored in the "Passive DNS" column for the domain selected from the DNS trace verification table 24a (in S25).

When the record does not exist (No in S24), the DNS trace verifying section 12 causes "No Records" to be stored in the "Passive DNS" column for the domain selected from the DNS trace verification table 24a (in S26).

Then, the DNS trace verifying section 12 determines whether an unselected domain exists in the DNS trace verification table 24a (in S27). When the unselected domain exists (Yes in S27), the DNS trace verifying section 12 causes the process to return to S22 and continuously executes the processes of S22 to S27 until all the domains are selected.

When the unselected domain does not exist (No in S27), the DNS trace verifying section 12 outputs the DNS trace verification table (updated) 24b including "verification results" associated with the "Active DNS" and the "Passive DNS" for the domains (in S28) and terminates the process.

Figure 9:
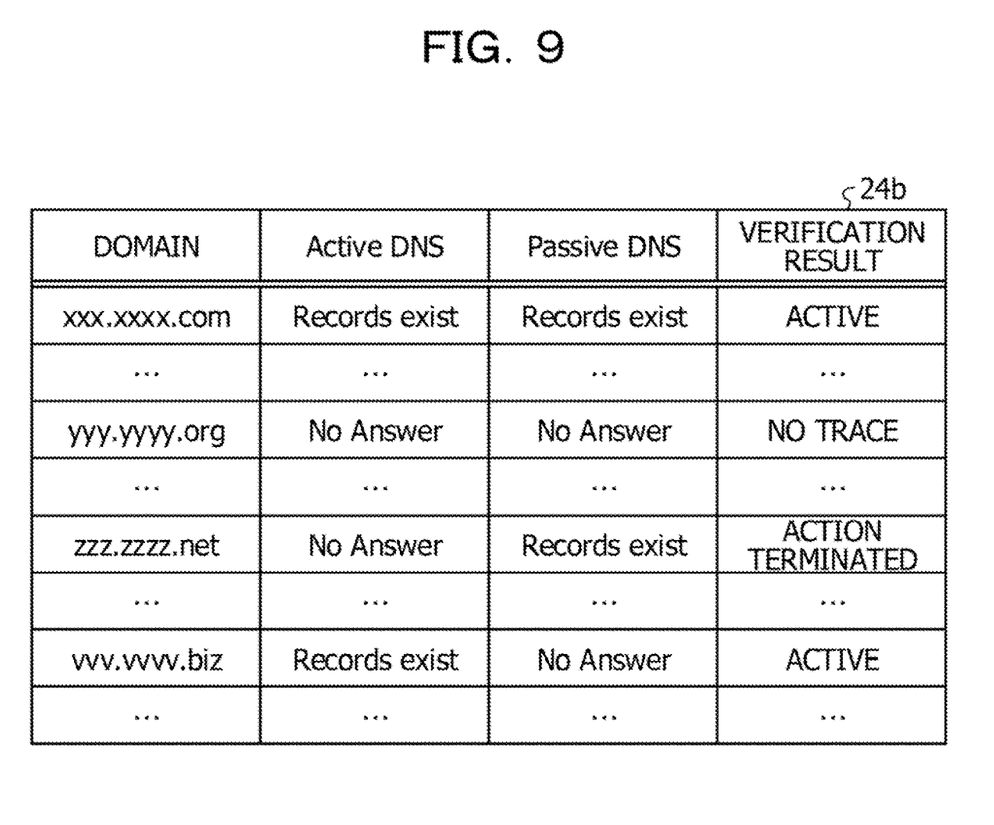
FIG. 9 is an explanatory diagram illustrating an example of the DNS trace verification table (updated)

FIG. 9 is an explanatory diagram illustrating an example of the DNS trace verification table (updated) 24b. As illustrated in FIG. 9, when "Records exist" Is stored in the "Active DNS" and "Passive DNS" columns, a trace may be followed in the DNS and thus the DNS trace verifying section 12 outputs a "verification result" indicating "active". When "No Answer" is stored in the "Active DNS" and "Passive DNS" columns, a trace is not observed in the DNS and thus the DNS trace verifying section 12 outputs a "verification result" Indicating "no trace". "No trace" Indicates that the domain is an alarming malicious domain since a state in which any behavior in the DNS is not observed regardless of the fact that the domain is shared as a malicious domain is significantly unnatural.

When "No Answer" is stored in the "Active DNS" column and "Records exist" is stored in the "Passive DNS" column, it is considered that the domain is removed after the DNS is used for a certain time period, and thus the DNS trace verifying section 12 outputs a "verification result" indicating "action terminated". When the "Records exist" is stored in the "Active DNS" column and "No Answer" is stored in the "Passive DNS" column, it is basically considered that an attack is active and that a DNS response packet flows to a location where a Passive DNS sensor does not exist, and thus the DNS trace verifying section 12 outputs a "verification result" indicating "active". It may be determined that "active" indicates that the attack is active in a cache DNS server 30 that does not have a Passive DNS sensor.

The user may easily confirm details of the evaluation of the domains and remarks about the evaluation of the domains by confirming "verification results" for the domains in the DNS trace verification table (updated) 24b.

As described above, the information processing device 1 includes the DNS inquiring section 10 and the DNS trace verifying section 12. The DNS inquiring section 10 makes, based on the domain information included in the input indicator list 20, an inquiry about whether an IP address associated with the domain information exists to each of the multiple cache DNS servers 30, which manage the associations between the domain information and the IP addresses. The DNS trace verifying section 12 makes an inquiry about an answer history related to the domain information to the Passive DNS database 31, which is used to monitor communication of the cache DNS servers 30 and manage answer histories related to the associations between the domain information and the IP addresses. The DNS trace verifying section 12 outputs a result of diagnosing a threat detail of a cyber attack related to the domain information, based on the ratio of the number of answers indicating that an IP address associated with the domain information does not exist with respect to the number of all answers acquired from each of the cache DNS servers 30, and answer histories acquired from the Passive DNS database 31. For example, the DNS trace verifying section 12 outputs the DNS trace verification table (updated) 24b indicating the diagnosis result, which has been obtained by verifying the cyber attack related to the domain information and indicates "active", "action terminated", "no trace", or the like.

Thus, the information processing device 1 supports the user to evaluate a current state ("active", "activity terminated", or "no trace") of a malicious domain included in the indicator list 20 related to cyber attacks. The information processing device 1 executes the verification based on the ratio of the number of answers indicating that an IP address does not exist with respect to the number of all answers from the multiple cache DNS servers 30. Thus, even when, for example, some cache DNS servers 30 execute the blocking for security, whether a domain has been removed may be determined.

For example, when the no-answer ratio that is the ratio of the number of answers indicating an IP address associated with the domain information does not exist with respect to the number of all answers exceeds a predetermined value (no-answer threshold 23), the DNS trace verifying section 12 diagnoses that an IP address associated with the domain information does not exist. As an example, since the number of cache DNS servers 30 for which security is enhanced as a policy is small, the no-answer threshold 23 is set to a relatively high value (of 0.8 to 0.9). Thus, even when the blocking is executed by some of the cache DNS servers 30, whether a domain has been removed may be determined.

The information processing device 1 verifies a cyber attack related to the domain information based on the answer histories indicated in the Passive DNS database 31 used to monitor communication of the cache DNS servers 30. For example, when the DNS trace verifying section 12 diagnoses that an IP address associated with the domain information does not exist, and there is a time period for which an IP address based on an answer history related to the IP address associated with domain information exists, the DNS trace verifying section 12 outputs a diagnosis result "activity terminated" indicating that a cyber attack activity has been terminated. Thus, the information processing device 1 may easily evaluate "activity terminated" indicating a state in which a domain has been removed regardless of the fact that a cache DNS server 30 has been used.

The constituent components of the devices illustrated in the drawings may not be physically configured as illustrated in the drawings. Specific forms of the distribution and integration of the devices are not limited to those illustrated in the drawings, and all or some of the devices may be functionally or physically distributed and integrated in arbitrary units based on various loads, usage statuses, and the like.

All or arbitrary some of the various processing functions to be executed by the information processing device 1 may be executed by a central processing unit (CPU) (or a microcomputer, such as a microprocessor unit (MPU) or a micro controller unit (MCU)). All or arbitrary some of the various processing functions may be executed by a program analyzed and executed by the CPU (or the microcomputer, such as the MPU or the MCU) or may be executed by hardware using wired logic. In addition, the various processing functions to be executed by the information processing device 1 may be executed by causing multiple computers to collaborate with each other by cloud computing.

Figure 10:
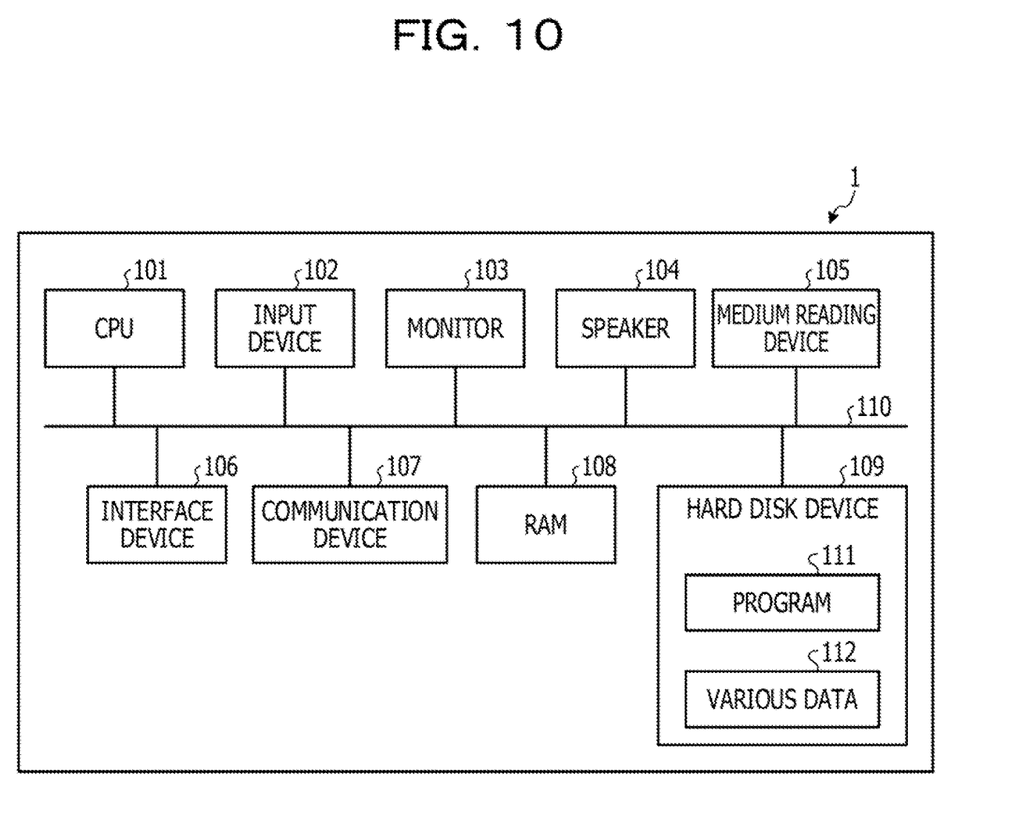
FIG. 10 is a block diagram illustrating an example of a hardware configuration of the information processing device according to the embodiment.

The various processes described in the embodiment may be realized by causing a computer to execute a program prepared in advance. An example of the computer (hardware) that executes the program having the same functions as those described above in the embodiment is described below. FIG. 10 is a block diagram illustrating an example of a hardware configuration of the information processing device 1 according to the embodiment.

As Illustrated in FIG. 10, the information processing device 1 includes a CPU 101 for executing various arithmetic processing, an input device 102 for receiving input data, a monitor 103, and a speaker 104. The information processing device 1 also includes a medium reading device 105 for reading a program and the like from a recording medium, an interface device 106 for coupling the information processing device 1 to various devices, and a communication device 107 that communicates with and is coupled to an external device via a cable or wirelessly. The information processing device 1 also includes a RAM 108 for temporarily storing various information and a hard disk device 109. The units (101 to 109) within the information processing device 1 are coupled to a bus 110.

In the hard disk device 109, a program 111 for executing the various processes, which are to be executed by the DNS inquiring section 10, the DNS answer evaluating section 11, the DNS trace verifying section 12, and the like, is stored. The DNS inquiring section 10, the DNS answer evaluating section 11, the DNS trace verifying section 12, and the like are described above in the embodiment. In addition, in the hard disk device 109, various data 112 to be referenced by the program 111 is stored. The input device 102 receives operation information input from an operator, for example. The monitor 103 displays various screens to be operated by the operator, for example. The interface device 106 is coupled to a printing device or the like, for example. The communication device 107 is coupled to a communication network, such as a local area network (LAN), and communicates various information with the external device via the communication network.

The CPU 101 reads the program 111 stored in the hard disk device 109, loads the program 111 into the RAM 108, and executes the program 111, thereby executing the various processes related to the DNS inquiring section 10, the DNS answer evaluating section 11, and the DNS trace verifying section 12, and the like. The program 111 may not be stored in the hard disk device 109. For example, the information processing device 1 may read the program 111 stored in a recording medium readable by the information processing device 1 and execute the program 111. The recording medium readable by the information processing device 1 corresponds to a portable recording medium, such as a CD-ROM, a DVD, or a Universal Serial Bus (USB) memory, a semiconductor memory, such as a flash memory, a hard disk drive, or the like, for example. The program 111 may be stored in a device coupled to a public line, the Internet, a LAN, or the like, and the information processing device 1 may read the program 111 from the device via the public line, the Internet, the LAN, or the like and execute the program 111.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A cyber attack evaluation method executed by a computer, the method comprising: making, based on first domain information included in input cyber attack information, a first query about whether a first address associated with the first domain information exists to a plurality of first managing servers that manage associations between domain information and addresses; making a second query about a response history related to the first domain information to a second managing server that monitors communication of the first managing servers and manages response histories, related to the associations between domain information and addresses, from the first managing servers; calculating a no-answer ratio by dividing a first number by a second number, the first number being a number obtained by counting, from among the plurality of first managing servers, a number of first managing servers that have not provided in response to the first query an answer indicating that the first address associated with the first domain information exists, the second number being a number obtained by counting a number of the plurality of first managing servers to each of which the first query has been made; and outputting a result of diagnosing a threat of a cyber attack related to the domain information based on the calculated no-answer ratio and the response histories related to the first domain information, wherein the outputting of the result includes determining that the first address associated with the first domain information does not exists in the plurality of first managing servers in case where the calculated no-answer ratio is greater than a threshold.

2. The cyber attack evaluation method according to claim 1, wherein the method further comprising executing to output a diagnosis result indicating that an activity of the cyber attack related to the first domain information has been terminated, when it is diagnosed that the first address associated with the first domain information does not exist and there is a time period for which the first address based on an answer history related to the first address associated with the first domain information exists.

3. The cyber attack evaluation method according to claim 1, wherein the first address is an Internet Protocol (IP) address.

4. A cyber attack apparatus, comprising: a memory; and a processor coupled to the memory and the processor configured to: make, based on first domain information included in input cyber attack information, a first query about whether a first address associated with the first domain information exists to multiple first managing servers that manage associations between domain information and addresses, make a second query about an response history related to the first domain information to a second managing server that monitors communication of the first managing servers and manages response histories, related to the associations between domain information and addresses, from the first managing servers, calculating a no-answer ratio by dividing a first number by a second number, the first number being a number obtained by counting, from among the plurality of first managing servers, a number of first managing servers that have not provided in response to the first Query an answer indicating that the first address associated with the first domain information exists, the second number being a number obtained by counting a number of the plurality of first managing servers to each of which the first Query has been made, and output a result of diagnosing a threat of a cyber attack related to the domain information based on the calculated no-answer ratio and the responses histories related to the first domain information wherein the outputting of the result includes determining that the first address associated with the first domain information does not exists in the plurality of first managing servers in case where the calculated no-answer ratio is greater than a threshold.

* * * * *